United States Patent [19]
Koch et al.

[11] Patent Number: 5,267,890
[45] Date of Patent: Dec. 7, 1993

[54] LOADING DEVICE FOR POULTRY BREAST FILLET SKINNER

[76] Inventors: Jay Koch, 177 Ocean Shore Dr., Key Largo, Fla. 33037; C. Andrew Estes, 211 Widgeon Rd., Russellville, Ark. 72801

[21] Appl. No.: 972,226
[22] Filed: Nov. 5, 1992
[51] Int. Cl.$^5$ .......................................... A22C 17/12
[52] U.S. Cl. ................................. 452/125; 452/127
[58] Field of Search ................ 452/183, 125, 127, 130

[56] References Cited

U.S. PATENT DOCUMENTS

| | | | |
|---|---|---|---|
| 2,590,747 | 3/1952 | Birdseye | 452/127 |
| 3,733,997 | 5/1973 | Beasley | 452/127 |
| 4,561,150 | 12/1985 | Townsend | 452/127 |
| 4,979,269 | 12/1990 | Norrie | 452/171 |
| 5,090,939 | 2/1992 | Leblanc | 452/127 |

*Primary Examiner*—Willis Little
*Attorney, Agent, or Firm*—Ray F. Cox, Jr.

[57] ABSTRACT

The present invention relates to a device for lifting the skin and loading a poultry part into a skinning machine and, in particular, for loading a poultry breast fillet into a poultry breast fillet skinning machine. In the preferred embodiment, a pair of endless loop link chains travel around a path defined by respective pairs of vertically rotating sprocket wheels. The forward sprocket wheels are located at a slightly lower elevation than the rear sprocket wheels. Each of the links in the two link chains contains an outwardly projecting gripping finger. As the links pass over the sprocket wheels the gripping fingers tend to separate at their outer ends. As the links travel along the straight segments between the sprocket wheels, the gripping fingers tend to assume a more closely spaced relationship which pinches folds of skin on the poultry part. As the poultry part is carried into the mechanism, the slight rise in elevation toward the rear sprocket wheels causes the skin to be lifted up and away from the poultry part. The mechanism is thus able to initiate the skin separation process.

7 Claims, 2 Drawing Sheets

LOADING DEVICE FOR POULTRY BREAST FILLET SKINNER

BACKGROUND OF THE INVENTION

The present invention relates to a device for lifting the skin and loading a poultry part into a skinning machine and in particular for loading a poultry breast fillet into a poultry breast fillet skinning machine.

A poultry breast fillet skinner is disclosed in U.S. Pat. No. 5,127,812 issued on Jul. 7, 1992 to Koch, et al. This patent, which is incorporated herein by reference, discloses a device for removing the skin from a poultry breast fillet. When separated from the remainder of the poultry carcass, the poultry breast fillet comprises the two halves of the poultry breast covered by and connected by the associated skin and cartilage. In order to remove the skin, the invention disclosed in the cited patent relies on the existence of pockets which are formed between the skin and the two halves of the breast fillet. These pockets are due to certain areas along each of the two halves of the breast fillet wherein the skin is loosely attached. The invention of the cited patent comprises a table, a lower conveyer supported on the table, an upper conveyer with means to allow the upper conveyer to be pressed down toward the lower conveyer so as to firmly grip the poultry breast fillet, and a wing disposed between the upper and lower conveyers which effects the separation of the skin from the poultry breast fillet. The wing, which provides the skin separation action, has a pair of forward-pointing projections which initiate the skin separation process when the projections are inserted into the described pockets formed between the skin and the two halves of the breast fillet. The projections widen toward the discharge end of the mechanism so that the skin is gradually separated from the breast portion as the breast fillet travels through the machine. The pair of forward-facing projections gradually widen toward the discharge end of the machine finally defining a narrow, sharp edged slot. The sharp edges of the slot severe the remaining connection of the skin to the breast fillet allowing the skinned breast fillet and the skin to be discharged separately.

The invention of the cited patent provides a means of skinning poultry breast fillets, or any type of poultry part which exhibits a pocket of the sort described, which greatly reduces the number of human operators required to perform the skinning operation. Nevertheless, a human operator and a certain amount of skill is required to position the poultry breast fillet onto the skinning machine by locating, forming and placing the pockets onto the forward-facing projections of the skinning machine.

A need, therefore, exists for a device to perform this loading operation with greater speed and uniformity in results than would be possible with a human operator.

Furthermore, many types of poultry skinning machines would benefit from a device which has the capability of lifting the skin from a poultry part and initiating the pulling away of the skin from the meat portion in order to efficiently automate the skinning process.

SUMMARY OF THE INVENTION

The present invention solves the identified problem by providing for a mechanism to form the pockets between the skin and the two halves of the poultry breast fillet and loading the poultry breast fillet onto the skinning machine by inserting the forward-facing projections of the skinning machine into the respective pockets formed on the poultry breast fillet. Even where the pockets do not exist or are not susceptible to easily being formed, the present invention is able to initiate the skin separation process. This purpose is accomplished by a pair of endless loop link chains which travel around a path defined by respective pairs of vertically rotating sprocket wheels. In applications other than the skinning of poultry breast fillets, different numbers of link chains may be employed. The present invention is also adaptable to the skinning of poultry parts other than breast fillets; for example, bone-in parts such as thighs, breasts, and whole legs and boned parts such as thighs and whole legs. The sprocket wheels drive the motion of the link chain and also define the path traveled by the link chain. The forward sprocket wheels are located at a slightly lower elevation than the rear sprocket wheels. As a result, the link chains pass over the forward sprocket wheels and travel along a straight segment of chain which gradually increases in elevation relative to the horizontal until it passes over the rear sprocket wheel to complete the loop.

Each of the links in the two link chains contains an outwardly projecting gripping finger. As the links pass over the sprocket wheels, the gripping fingers tend to separate at their outer ends so as to remain orthogonal to the motion of their respective lengths. As the links travel along the straight segments between the sprocket wheels, the gripping fingers tend to assume a more closely spaced relationship. Each adjacent pair of gripping fingers, therefore, opens and closes twice on each complete circuit of the path around the pair of sprocket wheels.

The poultry breast fillet is placed skin side up along a conveyer belt which carries it into the feeding mechanism. The skin is gripped between adjacent pairs of gripping fingers and carried into the feeding mechanism. Each half of the poultry breast fillet is gripped by its respective link chain. As the breast fillet is carried further into the mechanism, the slight rise in elevation toward the rear sprocket wheels causes the skin to be lifted up and away from the breast halves. An essentially horizontal plate disposed between the pairs of link chains holds the center of the breast fillet down so that the upward pulling action of the link chains forms the pockets on either side of the poultry breast fillet. The placement of the forward-facing projections of the skinning machine at the proper location causes the respective pockets formed in each half of the poultry breast fillet to be placed onto the projections of the skinning machine.

As the respective pairs of gripping fingers approach the rear sprocket wheels, the fingers separate and release the skin of the breast fillet. At this point the breast fillet continues the skinning process as disclosed in the cited patent. It should be understood that the mechanism of the present invention is equally adaptable to the loading of poultry parts other than poultry breast fillets into skinning mechanisms adapted to such poultry parts. The description of the present invention in relation to a preferred embodiment in which the poultry part is a poultry breast fillet is not to limit the scope of the invention to the skinning of breast fillets.

BRIEF DESCRIPTION OF THE DRAWINGS

The preferred embodiment of the present invention may be more fully understood from the following detailed description of the preferred embodiment in conjunction with the appended drawings in which.

DETAILED DESCRIPTION OF THE PREFERRED EMBODIMENT

Figure 1:
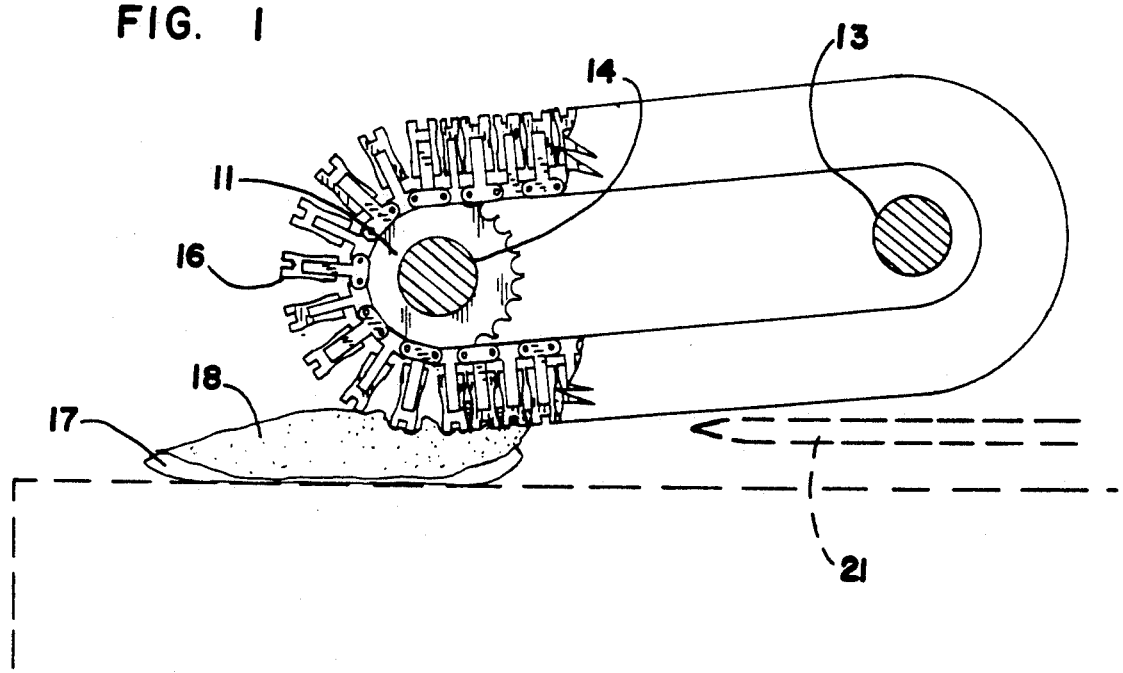
FIG. 1 is a sectional plan view showing one of the pair of link chains and associated sprocket wheels. The forward-facing projections of the skinning machine are illustrated by the broken lines.

The overall configuration of the present invention may be described with reference to FIG. 2. A pair of spaced apart, endless loop, link chains 10 are disposed about a pair of forward sprocket wheels 11 and rear sprocket wheels 12. The sprocket wheels 11 and 12 rotate in vertical planes. The axes of rotation of the forward sprocket wheels 11 are in the same horizontal plane. Likewise, the axes of rotation of the rear sprocket wheels are in the same horizontal plane. However, as can be seen with reference to FIG. 1, the shaft 13 on which the rear sprocket wheels are mounted is disposed at a slightly higher elevation than the shaft 14 on which the forward sprocket wheels 11 are mounted.

In operation, the sprocket wheels 11 and 12 are driven in rotation such that each of the link chains 10 describes a path which passes downwardly around the front sprocket wheels 11, rearwardly along a straight segment angling slightly upward toward the rear sprocket wheels 12, upwardly around the rear sprocket wheel 12 and forwardly on a slightly downward straight path to the point of origin around the front sprocket wheels 11. The link chains 10 may be driven either by the forward drive shaft 14 or the rear drive shaft 13. The pair of link chains 10 may be driven individually but if so it is important that the motion of the two link chains 10 by synchronized to the same rate. The means for driving the link chains 10 may be any of a number of common mechanisms well known in the art.

Figure 3:
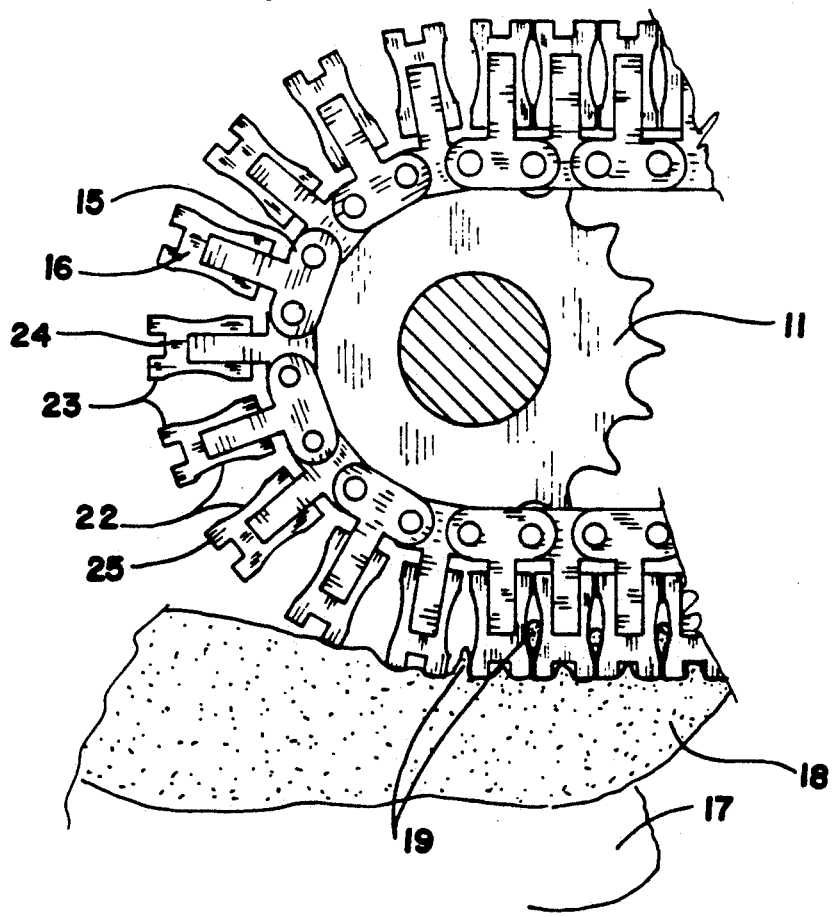
FIG. 3 is a partial view of one of the link chains of the present invention showing the action of the gripper fingers in the vicinity of a forward sprocket wheel.

Each of the link chains 10 is composed of a plurality of mutually connected links 15 as shown in detail on FIG. 3. Each link has a gripping finger 16 mounted perpendicular to the link 15 such that the gripping finger 16 is always orthogonal to the direction of travel of the link chain 10. As a result the spaced relationship between pairs of adjacent gripping finger 16 changes as each link chain 10 progresses around the path determined by the sprocket wheels 11 and 12. While on the relatively straight segments between the sprocket wheels 11 and 12, the gripping fingers 16 are spaced relatively close together. As a particular pair of gripping fingers 16 passes around either of the sprocket wheels 11, 12, the gripping fingers tend to move into a radially spaced apart relationship. Each adjacent pair of gripping fingers 16 will appear to open as it begins to pass around one of the sprocket wheels 11, 12 and to close upon exiting the vicinity of the sprocket wheels 11, 12.

The action of the gripping fingers 16 is illustrated with reference to FIG. 3. A poultry breast 17 with attached skin 18 is shown entering the loading device. The pivoting assembly 26, comprising the link chains 10, the sprocket wheels 11, 12, the shafts 13, 14, and the left and right support frames 30, 31, is pivoted about the rear axis 13 so as to apply pressure onto the poultry breast fillet. As each adjacent pair of gripping fingers 16 exits from the vicinity of the sprocket wheel 11, a small fold of skin 19 is formed and pinched between adjacent pairs of gripping fingers 16.

As the breast fillet 17 is carried further into the device, the slightly elevated position of the rear sprocket wheels 12 come into play. As the elevation of the link chains 10 increase toward the rear of the device, the skin 18 of the breast fillet 17 is pulled slightly upward, forming a pocket. Even if no natural predisposition to forming a pocket is present in the poultry part, the action of the present invention is capable of forming such a pocket.

Figure 2:
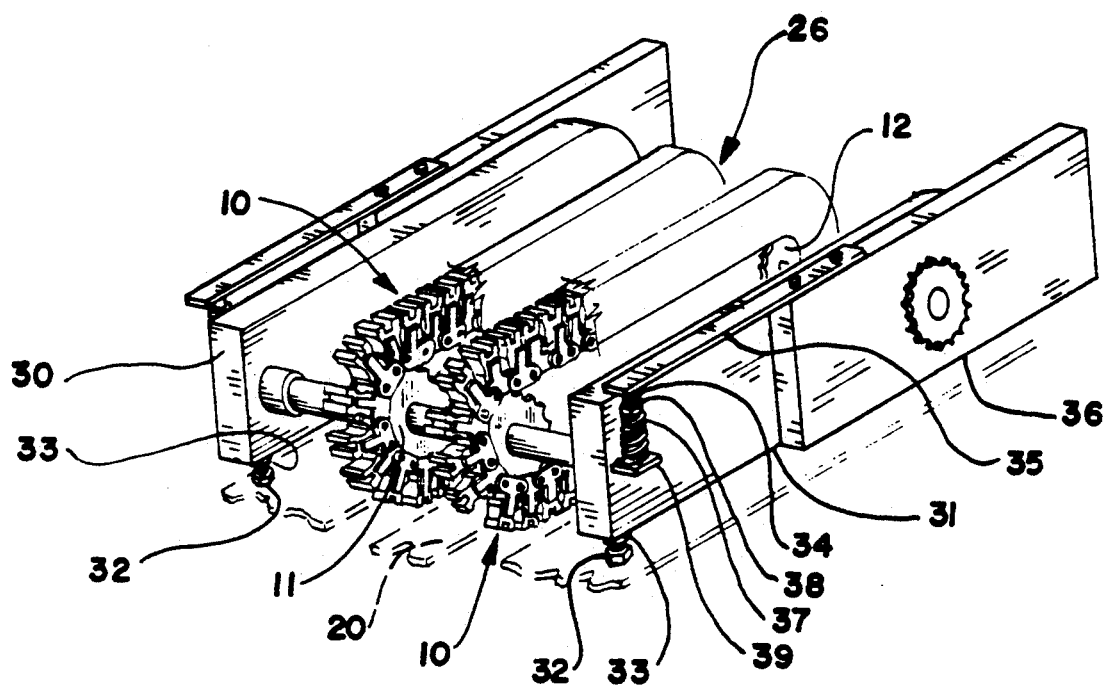
FIG. 2 is a prospective view of the present invention.

Referring to FIG. 2, it will be noted that since there are a pair of link chains 10 the breast 17 is gripped at a point above each half of the breast fillet 17. The entire breast fillet 17 is not lifted upward since an essentially horizontal plate 20 is disposed between each of the link chains 10. The plate 20 restrains the breast fillet 17 along the center line between the two breast halves to facilitate the forming of pockets along either breast half.

The poultry breast fillet skinner disclosed in U.S. Pat. No. 5,127,812, which is incorporated herein by reference, discloses forward-facing projections 21, shown on FIG. 1 as broken lines. The forward-facing projections 21 enter the pockets formed by the present invention, which commences the skinning operation disclosed in the cited patent. As the poultry breast fillet reaches the vicinity of the rear sprockets 12, the gripping fingers 16 move apart in the reverse of the process described herein in relation to the forward sprockets 11. As a result, the skin 18 of the poultry breast fillet 17 is released by the present invention and the process of skinning the poultry breast fillet continues as disclosed in the above cited patent.

As may be seen with reference to FIG. 3, the gripping action of the gripping finger 16 is enhanced by providing overflow recesses 22 on the respective interior faces 23 of each of the gripping fingers 16. The action of the overflow recesses 22 is to form folds 19 in the skin 18 which tend to be gripped more firmly between adjacent pairs of gripping fingers 16 and with less inclination to pull loose as the breast fillet 17 is advanced into the device.

Furthermore, the traction of the gripping fingers 16 against the skin 18 of the breast fillet 17 is enhanced by providing grooves 24 in the exterior faces 25 of each gripping finger 16. The effect of these grooves is similar in nature to that of a tire tread and provides better traction for urging the poultry breast 17 into the device and also enhances the formation of folds 19 in the skin 18.

In order for the gripping fingers 16 to firmly contact the skin 18 of the breast fillet 17, means are provided to urge the gripping fingers 16 into contact with the skin 18. As described above, the pivoted assembly 26 is pivoted about the rear shaft 13 so that the weight of the pivoted assembly 26 bears upon the breast fillet 17. In order to provide better control and adjustability for the mechanism, two additional features are incorporated in the preferred embodiment. First, the spacing between the ends of the gripping fingers 16 and the support plate 20 is adjusted by means of support feet 32. The support feet 32 are threadedly received into the left and right support frames 30, 31. By moving the support feet 32 in and out of the support frames 30, 31, the height at which the support assembly 26 rests above the support plate 20 may be adjusted so as to accomodate variation in the thickness of the breast fillet 17. The adjustment in the support feet 32 is fixed by means of jam nuts 33.

The second means for accomodating variations in the thickness of the breast fillet 17 is a biasing mechanism which is described with reference to FIG. 2. A threaded rod 34 is fixed vertically with respect to the non-pivoting portion of the present invention. Although various means could be employed to accomplish this purpose, in the preferred embodiment a support beam 35 is attached to the fixed frame 36 and to the threaded rod 34. A lock nut 38 is threaded onto the threaded rod 34. A biasing spring 37 is positioned on the threaded rod 34 so as to bear upon the lock nut 38 and also upon a shelf 39 which is rigidly affixed to the pivoting assembly 26. The pivoting assembly 26 is thus biased into contact with the breast fillet 17. The degree of pressure asserted by the biasing spring 37 is adjusted by varying the position of the lock nut 38 on the threaded rod 34. The mechanism of the present invention is thus able to accomodate the varying thickness of the poultry part as it advances into the mechanism.

Various modifications to the preferred embodiment as described herein would be obvious to those of ordinary skill in the art and it is not intended that the preferred embodiment as described above in any way limit the scope of the present invention as may be determined by a reference to the following claims.

What is claimed is:

1. A loading device for machine for removing the skin from poultry parts, comprising:
    one or more endless-loop link chains, each comprising a plurality of mutually connected links, and each of said link chains being driven in a vertical plane along a path determined by a pair of spaced apart, vertically rotating sprocket wheels comprising a forward sprocket wheel and a rear sprocket wheel, said forward sprocket wheel having a axis of rotation in a horizontal plane and said rear sprocket wheel having an axis of rotation in a horizontal plane higher than said horizontal plane of said forward sprocket wheel;
    said path comprising consecutively a straight forwardly-driven upper segment, a semi-circular downwardly driven forward segment, a straight rearwardly driven lower segment, and a semi-circular upwardly driven rearward segment;
    means for driving said sprocket wheels;
    gripping fingers attached orthogonally to each of said links, such that said gripping fingers are radially spaced apart over said semi-circular segments of said path and closely spaced over said straight segments of said path;
    means for conveying into said loading device a poultry part of the type comprising a meat portion and associated skin;
    means for urging said gripping fingers into contact with said poultry part such that said skin is gripped between consecutive respective pairs of said gripping fingers; and
    means for restraining said meat portion of said poultry part against any tendency toward upper motion.

2. A loading device as set forth in claim 1, wherein each of said gripping fingers further comprises an outer face and a pair of interior faces wherein interior faces of adjacent gripping fingers provide the action of gripping said skin, and further wherein each of said interior faces further comprises an overflow recess disposed to receive and grip said skin.

3. A loading device as set forth in claim 2, wherein each of said exterior faces further comprises a groove for traction against said skin.

4. A loading device for a poultry breast fillet skinner, comprising:
    a pair of spaced apart endless-loop link chains, each comprising a plurality of mutually connected links, and each of said link chains being driven in a vertical plane along a path determined by a pair of spaced apart vertically rotating sprocket wheels comprising a forward sprocket wheel and a rear sprocket wheel, said forward sprocket wheels having a common axis of rotation in a horizontal plane and said rear sprocket wheels having a common axis of rotation in a horizontal plane higher than said horizontal plane of said forward sprocket wheels;
    said path comprising consecutively a straight forwardly driven upper segment, a semi-circular downwardly driven forward segment, a straight rearwardly driven lower segment, and a semi-circular upwardly driven rearward segment;
    means for driving said sprocket wheels;
    gripping fingers attached orthogonally to each of said links, such that said gripping fingers are radially spaced apart over said semi-circular segments of said path and closely spaced over said straight segments of said path;
    means for conveying into said loading device a poultry breast fillet of the type comprising two deboned poultry breast halves connected along a center line and associated skin;
    means for urging said gripping fingers into contact with said poultry breast fillet such that said skin is gripped between consecutive respective pairs of said gripping fingers; and
    means for restraining said poultry breast fillet along said center line against any tendency toward upper motion.

5. A loading device as set forth in claim 4, wherein each of said gripping fingers further comprises an outer face and a pair of interior faces, wherein interior faces of adjacent gripping fingers provide the action of gripping said skin, and further wherein each of said interior faces further comprises an overflow recess disposed to receive and grip said skin.

6. A loading device as set forth in claim 5, wherein each of said exterior faces further comprises a groove for traction against said skin.

7. A loading device as set forth in claim 6, wherein said means for restraining comprises an essentially horizontal plate disposed between said link chains.

* * * * *